Patented Sept. 18, 1945

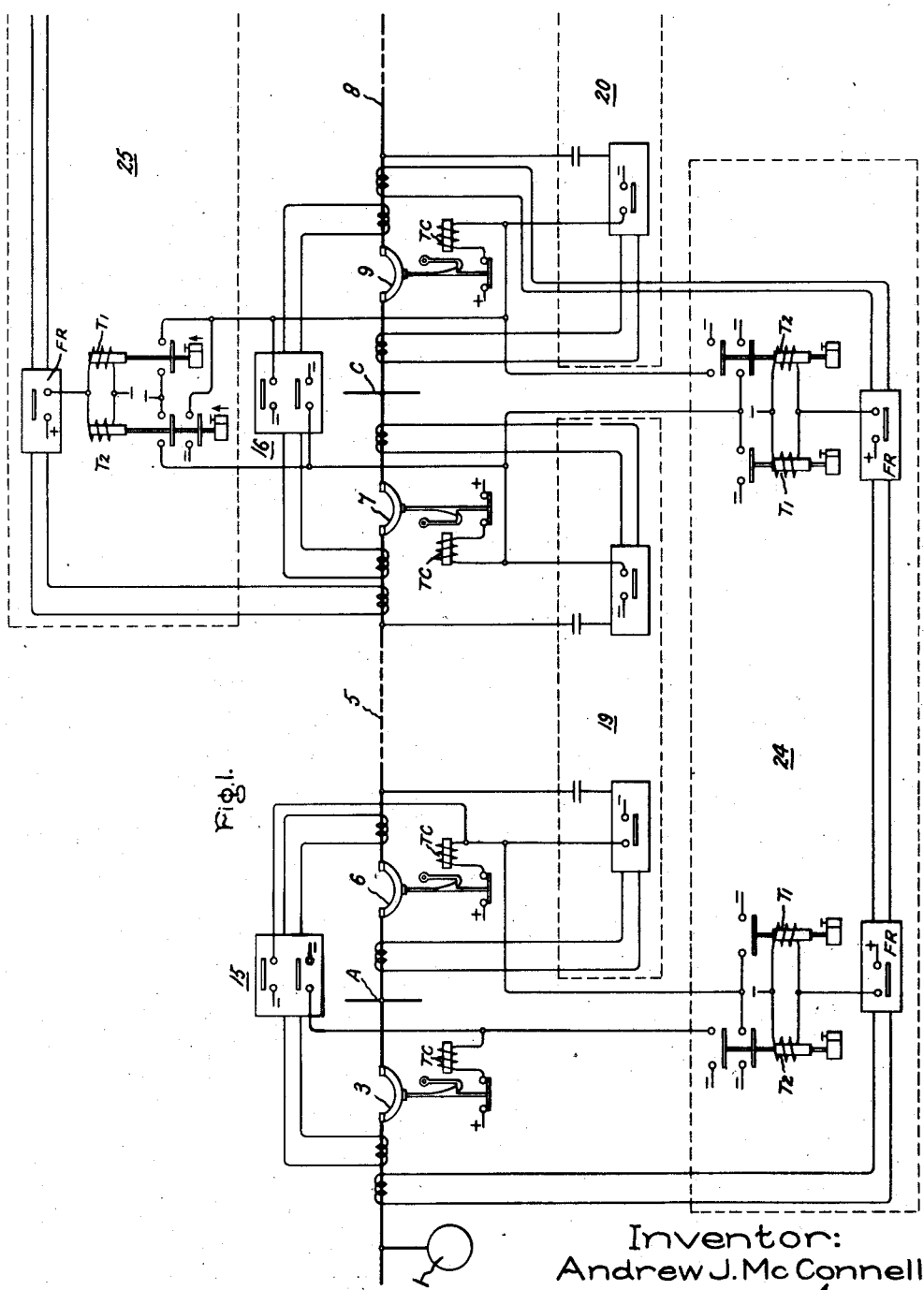

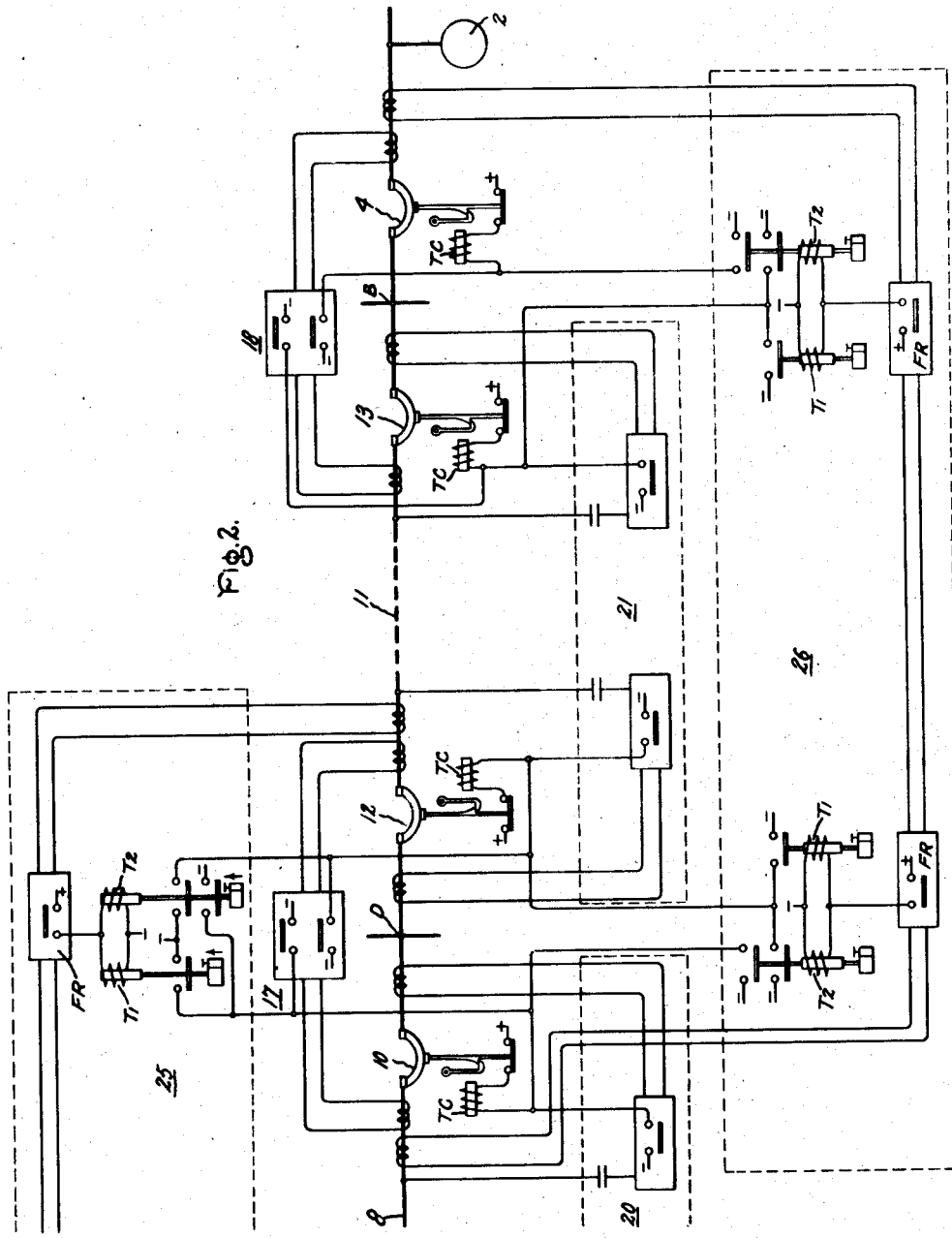

2,385,219

UNITED STATES PATENT OFFICE 2,385,219

PROTECTION OF ELECTRIC SYSTEMS

Andrew J. McConnell, Albany, N. Y., assignor to General Electric Company, a corporation of New York Application February 10, 1944, Serial No. 521,802

15 Claims. (Cl. 175—294)

My invention relates to improvements in the protection of electric systems and more particularly to improvements in the secondary or back-up protection of sectionalized electric power systems so as to provide protection in case of failure of the primary protective apparatus of any section. My invention is particularly adapted for use in cases in which the usual methods of back-up protection heretofore developed are inadequate or difficult to apply.

One object of my invention is to provide an improved back-up protective equipment for a section of a sectionalized electric power system which effects the disconnection of a fault from the system with as little interruption of service to the rest of the system as possible, in case the primary protective equipment for the faulty section fails for any reason to disconnect the fault from the system.

A further object of my invention is to provide an improved back-up protective equipment for a section of an electric power system which effects the disconnection from the system of only the associated line section and any adjacent section from which it may fail to be disconnected by its associated primary protective equipment.

Another object of my invention is to provide an improved back-up protective equipment which attempts first to effect the opening of a closed circuit interrupter in a faulty line section before effecting the disconnection of any of the other sections from which current is being supplied to the faulty line section through the circuit interrupter that has failed to open.

In accordance with my invention, each back-up protective equipment is of the well-known comparison type which compares certain electrical quantities such as currents, voltage, power, etc., at the extremities of a certain portion of the system at any given instant so that the protective equipment responds only to a fault within said portion of the system. In the preferred embodiment of my invention shown in the drawings, the portion of the system protected by each back-up equipment includes a line section and the two adjacent bus sections to which it is normally connected so that it responds only to a fault on this portion of the system, but it will be obvious that the portion of the system protected by the back-up protective equipment may include other parts of the system. For example, the portion of system protected by a back-up protective equipment may include only a line section and one of the adjacent bus sections normally connected thereto so that there would be two back-up protective equipments for each section.

When a fault occurs anywhere on the portion of the system to which the back-up protective equipment is responsive, it functions, after a time delay long enough to allow the primary protective equipment associated with the faulty section to effect the disconnection thereof, to effect the opening of the circuit interrupters of each adjacent section then connected to the faulty section and through which fault current is flowing into the faulty section. By overlapping the back-up protective equipments of adjacent sections, I am able to obtain complete back-up protection for the whole system.

My invention will be better understood from the following description when taken in connection with the accompanying drawings, the two figures of which when joined together illustrate schematically in single line diagram a sectionalized transmission system embodying my invention, and the scope of my invention will be pointed out in the appended claims.

In the drawings, Figs. 1 and 2 when joined together illustrate a sectionalized transmission line interconnecting the station bus sections A and B, respectively, energized by suitable sources of power 1 and 2 through the circuit interrupters 3 and 4. The transmission line is shown as comprising two intermediate substation bus sections C and D. The bus sections A and C are respectively connected to a line section 5 of the transmission line by the circuit interrupters 6 and 7, the bus sections C and D are respectively connected to a line section 8 of the transmission line by the circuit interrupters 9 and 10, and the bus sections D and B are respectively connected to a line section 11 of the transmission line by the circuit interrupters 12 and 13.

Each station bus section and each line section of the transmission line may be provided with any well-known type of protective equipment for effecting a quick opening of the circuit interrupters at the ends thereof only in response to a fault on the respective bus or line section. Preferably, the protective equipments for adjacent portions of the transmission system overlap in a manner well known in the art.

For the purpose of illustrating my invention, I have schematically shown the station bus sections A, B, C and D as being respectively provided with bus differential protective equipments 15, 18, 16 and 17, which may be of any of the well-known types, and the line sections 5, 8, and 11 of the transmission line as being respectively provided with the protective equipments 19, 20 and 21, which may be of any of the well-known transmitted auxiliary current control types. The bus differential protective equipment 15 is normally arranged in a well-known manner to effect the quick opening of the circuit interrupters 3 and 6 in response to a fault on the bus section A, and, similarly, each of the other bus differential protective equipments 16, 17 and 18 is normally arranged to effect in response to a fault on the associated station bus section a quick opening of the circuit interrupters at the ends thereof through which current is supplied to the associated bus section. The protective equipment 19 for the line section 5, which is schematically shown as being of the carrier current type, is normally arranged in a manner well known in the art to effect the quick opening of the circuit interrupters 6 and 7 at the ends of the line section 5 when a fault occurs thereon; and, similarly, the protective system 20, which is shown as being of the carrier current type, is normally arranged to effect the quick opening of the circuit interrupters 9 and 10 at the ends of the line section 8 when a fault occurs thereon, and the protective equipment 21, which is also shown as being of the carrier current type, is normally arranged to effect the quick opening of the circuit interrupters 12 and 13 at the ends of the line section 9 in response to a fault thereon. The fault responsive devices of the adjacent protective equipments 15 and 20, inclusive, are connected to the electric system in a well-known overlapping manner so as to ensure that a fault anywhere between the circuit interrupters 3 and 4 normally initiates the operation of at least one of the protective equipments to disconnect the fault from the system.

With the protective equipments 15 to 21, inclusive, arranged in the manner heretofore described, it is evident that, if each protective equipment functions properly, a fault anywhere on the transmission system results in the immediate disconnection of the faulty line or bus section. For example, if a fault occurs on the line section 8, the protective equipment 20 normally effects the quick opening of the circuit interrupters 9 and 10. Similarly, if a fault occurs on the bus section C, the protective equipment 16 immediately effects the quick opening of the circuit interrupters 7 and 9. If, however, in case of a fault on the line section 8, the protective equipment 20 fails to function properly or, for some other reason, the circuit interrupter 9 fails to open in response to a fault on the line section 8, it is desirable to have available some other protective equipment which will operate immediately after the protective equipment 20 has had time to function properly, to try again to open circuit interrupter 9 in the faulty section and then, if it does not succeed in doing this, open only the closed circuit interrupters through which current can flow to the fault from the adjacent sections of the system. For example, if the circuit interrupter 10 is opened properly but the circuit interrupter 9 fails to be opened by the protective equipment 20 in response to a fault on the line section 8, it is desirable to have the back-up protective equipment first try to open the circuit interrupter 9 and, if it does not succeed in doing this, then to effect the opening of the circuit interrupter 7 so as to disconnect the fault, line section 8 from the line section 5 in order that the rest of the system to the left of the circuit interrupter 7 may continue in operation.

In accordance with my invention, I provide each of the line sections 5, 8, and 11 of the transmission line with a back-up protective equipment of the comparison type which, in the particular embodiment shown in the drawings, is indicated as being arranged to respond to a fault not only on the associated protected section but also on the adjacent bus sections connected to the protected section. For example, the back-up protective equipment 24 for the line section 5 may be of any well-known comparison type which can be arranged to respond to a fault only on the bus sections A and C and the interconnecting line section 5. Similarly, the back-up protective equipment 25 for the section 8 may be of any well-known comparison type which can be arranged to respond to a fault only on the bus sections C and D and the interconnecting line section 8, and the back-up protective equipment 26 for the section 11 may be of any well-known comparison type which may be arranged to respond to a fault only on the bus sections D and B and the interconnecting line section 11.

Each of the back-up protective equipments, which for the purpose of simplicity is indicated as being of the differential pilot wire type but which could be any of the well-known transmitted auxiliary current control types, includes at each end thereof a fault responsive device FR which is arranged to close its contacts immediately in response to a fault on the portion of the system protected by the back-up protective equipment. Preferably, each of the back-up protective equipments is of the well-known type in which a fault responsive device FR only closes its contacts when fault current is being supplied into the protected section from the associated end. For example, the fault responsive device FR at the left-hand end of the back-up protective equipment 25 closes its contacts only when fault current is flowing from line section 5 into bus section C.

Each fault responsive device FR, when it closes its contacts, is also shown as being arranged to energize two associated time relays $T_1$ and $T_2$ which have different operating times. Time relay $T_1$, which has the shorter operating time, is arranged to complete an energizing circuit for the trip coil TC of the circuit interrupter at the associated end of the respective line section. It will be evident, however, that in cases where it is not desired to attempt to open the faulty interrupter, this time relay $T_1$ may be omitted. The time relay $T_2$, which has the longer operating time, is arranged to effect the energization of the trip coils TC of all of the adjacent circuit interrupters through which fault current is supplied to the associated end of the protected line section. For example, in case of a fault on the line section 8, the fault responsive devices FR at both ends of the section protected by the back-up protective equipment 25 close their respective contacts and initiate the timing operations of their respective time relays $T_1$ and $T_2$. Normally the primary protective equipment 20 functions in response to a fault on the line section 8 to open the circuit interrupters 9 and 10 and isolate the faulty line section 8 before the time relays $T_1$ and $T_2$ can complete their timing operations. Therefore, if the primary protective equipment 20 functions properly, the fault responsive devices FR of the back-up protective equipment 25 open their contacts and effect the resetting of the time relays T₁ and T₂ before they complete their timing operations.

Let it now be assumed that for some reason the primary protective equipment 20 fails to effect the opening of the circuit interrupter 9 in response to a fault on the line section 8, but does effect the opening of the circuit interrupter 10. The opening of the circuit interrupter 10 disconnects the faulty line section 8 from the right-hand portion of the transmission system so that the fault responsive device FR at the right-hand end of the back-up protective equipment 25 opens its contacts and effects the deenergization of its associated time relays T₁ and T₂. The fault responsive device FR at the left-hand end of the back-up protective equipment 25, however, maintains its contacts closed and the associated time relays T₁ and T₂ energized since fault current is flowing from the line section 5 through the bus section C to the fault on the line section 8. If the circuit interrupter 9 fails to open within the operating time of the time relay T₁ associated with the left-hand end of the back-up protective equipment 25, this time relay T₁ closes its contacts and completes another energizing circuit for the trip coil TC of the circuit interrupter 9 in order to try and effect the opening thereof. If, however, the circuit interrupter 9 still remains closed after this time relay T₁ closes its contacts, the associated time relay T₂ then closes its contacts and completes energizing circuits for the trip coils TC of both of the circuit interrupters 7 and 9. The opening of the circuit interrupter 7 then disconnects the fault from the line section 5 so that the left-hand portion of the transmission system is restored to a normal operating condition.

In case of a fault on a substation bus section such, for example, as bus section C, the associated primary bus differential protective equipment 16 normally effects the opening of the circuit interrupters 7 and 9. A fault on the bus section C also operates the fault responsive devices FR of the back-up protective equipments 24 and 25, since the bus section C is included within the respective portions of the transmission system protected by each of these back-up equipments. Therefore, if the primary bus differential protective equipment 16 fails to effect the immediate opening of the circuit interrupter 7 but succeeds in immediately opening the circuit interrupter 9, the time relay T₁ associated with the left-hand end of the back-up protective equipment 24 completes, a predetermined time after the fault occurs, an energizing circuit for the trip coil TC of the circuit interrupter 6 so that the fault on the bus section C is disconnected from the bus section A. In this case, the time relay T₁ at the right-hand end of the back-up protective equipment 24 does not complete another energizing circuit for the trip coil TC of the faulty circuit interrupter 7 because this time relay T₁ becomes deenergized as soon as the circuit interrupter 9 opens and interrupts the flow of fault current from the line section 8 to the fault on the bus section C.

Although the time relay T₁ associated with the left-hand end of the back-up protective equipment 25 is energized and closes its contacts if the circuit interrupter 7 fails to open in response to a fault on the bus section C, the operation of this time relay T₁ has no effect at this time because the circuit interrupter 9 has already been tripped. The time relay T₁ associated with the right-hand end of the back-up protective equipment 25 is deenergized by the opening of the circuit interrupter 9 before this time relay completes its timing operation.

If the circuit interrupter 9 fails to open in response to the operation of the primary bus differential protective equipment 16 when a fault occurs on the bus section C, the time relay T₁ associated with the right-hand end of the back-up protective equipment 25 completes, a predetermined time after the fault occurs, an energizing circuit for the trip coil TC of the circuit interrupter 10 so that the fault on the bus section C is disconnected from the bus section D. In this case, the time relay T₁ at the left-hand end of the back-up protective equipment 25 does not complete another energizing circuit for the trip coil TC of the circuit interrupter 9 and the time relay T₁ at the left-hand end of the back-up protective equipment 24 does not complete its timing operation, because these time relays T₁ become deenergized as soon as the circuit interrupter 7 opens and interrupts the flow of fault current through the line section 5 to the fault on the bus section C.

Although the time relay T₁ associated with the right-hand end of the back-up protective equipment 24 is energized and closes its contacts if the circuit interrupter 9 fails to open in response to a fault on the bus section C, this time relay T₁ has no effect at the time because the circuit interrupter 7 has already been tripped.

In case of a fault on one of the end bus sections such, for example, as the bus section A, the primary bus differential protective equipment 15 normally effects the opening of the circuit interrupters 3 and 6, but if the circuit interrupter 6 fails to open, the time relay T₁ at the right-hand end of the back-up protective equipment 24 effects the opening of the circuit interrupter 7 to disconnect the fault from the bus section C. Since there is no circuit interrupter to back up the circuit interrupter 3 in case of a fault on the bus section A, all that the time relays of the back-up protective equipment 24 do, in the event that the circuit interrupter 3 fails to open in response to a fault on the bus section A, is to re-energize the trip coil TC of the circuit interrupter 3 when the associated time relay T₂ completes its timing operation. In case, however, the circuit interrupter 6 fails to be opened by the primary protective equipment 19 when a fault occurs on the line section 5, the time relays associated with the left-hand end of the back-up protective equipment 24 effect, in an obvious manner, first the energization of only the trip coil TC of the circuit interrupter 6 and then the energization of the trip coils TC of the circuit interrupters 3 and 6.

Therefore, it will be seen that, in the embodiment of my invention shown in Fig. 1, if a circuit interrupter at the end of a line section of the transmission system fails to open in response to the operation of the associated primary protective equipment when a fault occurs on the section, the associated back-up protective equipment first attempts to open the circuit interrupter that has failed to open, and then if this circuit interrupter still remains closed, the circuit interrupter between the adjacent bus section which is connected to the faulty section and the next line section of the system is opened to isolate from the system both the faulty line section and the bus section from which fault current is supplied to the faulty line section. However, if a circuit interrupter at the end of a line section of the transmission system fails to open in response to the operation of the associated bus differential protective equipment when a fault occurs on the adjacent bus section, the associated back-up protective equipment effects the opening of the circuit interrupter at the other end of the line section.

While I have shown my invention in connection with an electric power system that comprises a plurality of alternate line and bus sections in series, it will be obvious to anyone skilled in the art that my invention is equally applicable to any other electric power system irrespective of the number of line sections that may be connected to any given bus section. All that is required is that the back-protective equipment for each line section shall be connected in any well-known manner so that it responds only to a fault on the associated line section and on the bus sections to which it is connected and effects at the most when it operates over the disconnection from the system of the bus section from which the primary protective equipment fails to disconnect the line section.

Since the protective relay units and circuits of my back-up protective equipments form no part of the primary protective equipment, any failure of the protective relays of the primary equipment does not cause the back-up protective equipment to fail as such a failure sometimes does where the primary and back-up protective equipments employ some of the same relay units and circuits. It will be evident, however, that for economic reasons it may be desirable to use certain common devices for the two equipments where such devices are deemed to be sufficiently reliable.

While I have, in accordance with the patent statutes, shown and described my invention as applied to a particular system and as embodying various devices diagrammatically indicated, changes and modifications will be obvious to those skilled in the art, and I therefore aim in the appended claims to cover all such changes and modifications as fall within the true spirit and scope of my invention.

What I claim as new and desire to secure by Letters Patent of the United States is:

1. In a protective arrangement for a section of a sectionalized electric system, the combination of a protective equipment responsive only to a fault on said section for normally disconnecting said section from said system, and back-up protective means responsive only to a fault on said section and the sections adjacent thereto for effecting after a predetermined time interval the disconnection from said system of any of the adjacent sections that may be connected to said first mentioned section at the expiration of said predetermined time interval.

2. In a protective arrangement for a section of a sectionalized electric system, the combination of a protective equipment responsive only to a fault on said section for normally disconnecting said section from said system, and back-up protective means responsive only to a fault on a portion of said system which in part includes all of said section for effecting after a predetermined time interval the disconnection from said system of any adjacent section that may be connected to said first mentioned section at the expiration of said predetermined time interval.

3. In a protective arrangement for a line section of a sectionalized electric system which comprises two bus sections interconnected by said line section, the combination of a protective equipment responsive only to a fault on said line section for normally disconnecting said section from said bus sections, and back-up protective means responsive only to faults on said line section and said bus sections for effecting after a predetermined time interval the disconnection from said system of either of said bus sections that may be connected to said line section at the expiration of said predetermined time interval.

4. In a protective arrangement for an electric system having a line section, two bus sections, a circuit interrupter between said line section and one of said bus sections, and a second circuit interrupter between said line section and the other of said bus sections, the combination of a protective arrangement responsive only to a fault on said line section for normally effecting the opening of both of said circuit interrupters, and back-up protective means responsive to a fault on said line section for first attempting to effect the opening of either of said circuit interrupters that may be closed and then for effecting only the disconnection from said system of either of said bus sections that may be connected to said section.

5. In a protective arrangement for an electric system having a line section, two bus sections, a circuit interrupter between said line section and one of said bus sections, a second circuit interrupter between said line section and the other of said bus sections, and a trip coil for each circuit interrupter, the combination of a protective arrangement responsive only to a fault on said line section for normally effecting the energization of said trip coils, and back-up protective means responsive to a fault on said line section for first completing an energizing circuit for the trip coil of either of said circuit interrupters that may be closed after a fault has remained connected to said line section for a predetermined time interval and then for effecting only the disconnection from said system of either of said bus sections that may still be connected to said section.

6. In a protective arrangement for a bus section of a sectionalized electric system having a plurality of line sections connected to said bus section, the combination of a protective equipment responsive to a fault only on said bus section for normally disconnecting said bus section quickly from said system, and back-up protective equipment of the comparison type responsive to a fault on the respective line section and on said bus section for effecting after a predetermined time interval the disconnection from said system of the respective line section if it is connected to said bus section at the expiration of said predetermined time interval.

7. In a protective arrangement for a bus section of a sectionalized electric system having a plurality of line sections connected to said bus section, the combination of a protective equipment responsive to a fault on said bus section for normally disconnecting said bus section quickly from said system, and back-up protective equipment of the comparison type responsive to a fault on a portion of said system which in part includes said bus section for effecting after a predetermined time interval the disconnection from said system of any line section that may be connected to said bus section at the expiration of said predetermined time interval.

8. In a protective arrangement for an electric system having a plurality of line sections respectively interconnecting different bus sections, the combination of primary protective equipments respectively responsive to faults only on different line sections, for normally disconnecting the associated line sections quickly from the adjacent bus sections, and a time delay back-up protective equipment for each line section responsive only to faults on the associated line section and the adjacent bus sections connected thereto.

9. In a protective arrangement for an electric system having a bus section connected to a plurality of other bus sections by different line sections, the combination of a primary protective equipment responsive to a fault on said first mentioned bus section for normally disconnecting said first mentioned bus section quickly from the adjacent line sections, and back-up protective apparatus for said first mentioned bus section comprising a time delay back-up protective equipment of the comparison type for each line section responsive to a fault on the associated line section and the adjacent bus sections connected thereto.

10. In a protective arrangement for an electric system including a section and a plurality of other sections connected to said first mentioned section, the combination of means responsive to a fault on any of said other sections for effecting the disconnection of the faulty section from said first mentioned section, and a time delay back-up protective equipment of the comparison type responsive to a fault on any of said other sections while connected to said first mentioned section for disconnecting said first mentioned section from all of said other sections.

11. In a protective arrangement for an electric system having a line section and a plurality of bus sections connected to said line section, the combination of primary protective equipments respectively associated with said bus sections for effecting the disconnection thereof from said line section in response to a fault on the respective bus sections, and a time delay back-up protective equipment of the comparison type for said line section responsive to a fault on any of said bus sections while connected to said line section for disconnecting all of the bus sections from said line section.

12. In a protective arrangement for an electric system having a line section and a plurality of bus sections connected to said line section, the combination of primary protective equipments respectively associated with said bus sections for effecting the disconnection thereof from said line section in response to a fault on the respective bus sections, and a time delay protective equipment of the comparison type for said line section responsive to a fault on a portion of said system which includes all of said line sections and at least one of said bus sections.

13. In a protective arrangement for an electric system having a plurality of sections connected in series, the combination of an individual primary protective equipment for each section responsive to a fault thereon for normally effecting the quick disconnection of the section from the other section, and a time delay back-up protective equipment of the comparison type for each section responsive to a fault on the respective section and at least one of the adjacent sections.

14. In a protective arrangement for an electric system having a bus section and a plurality of line sections connected to said bus section, the combination of an individual primary protective equipment for each line section responsive to a fault thereon for normally effecting the quick disconnection thereof from the bus section, and a time delay back-up protective equipment of the comparison type for each line section responsive to a fault on the associated line section and said bus section for effecting the disconnection of the bus section from the other line section.

15. In a protective arrangement for an electric system having a bus section and a plurality of line sections connected to said bus section, the combination of an individual primary protective equipment for each line section responsive to a fault thereon for normally effecting the quick disconnection thereof from the bus section, a primary protective equipment for said bus section responsive to a fault thereon for normally effecting the quick disconnection of said bus section from said line sections, and a time delay back-up protective equipment of the comparison type for each line section responsive to a fault on the associated line section and said bus section for effecting the disconnection of the bus section from the other line section.

ANDREW J. McCONNELL.